Patented July 30, 1940

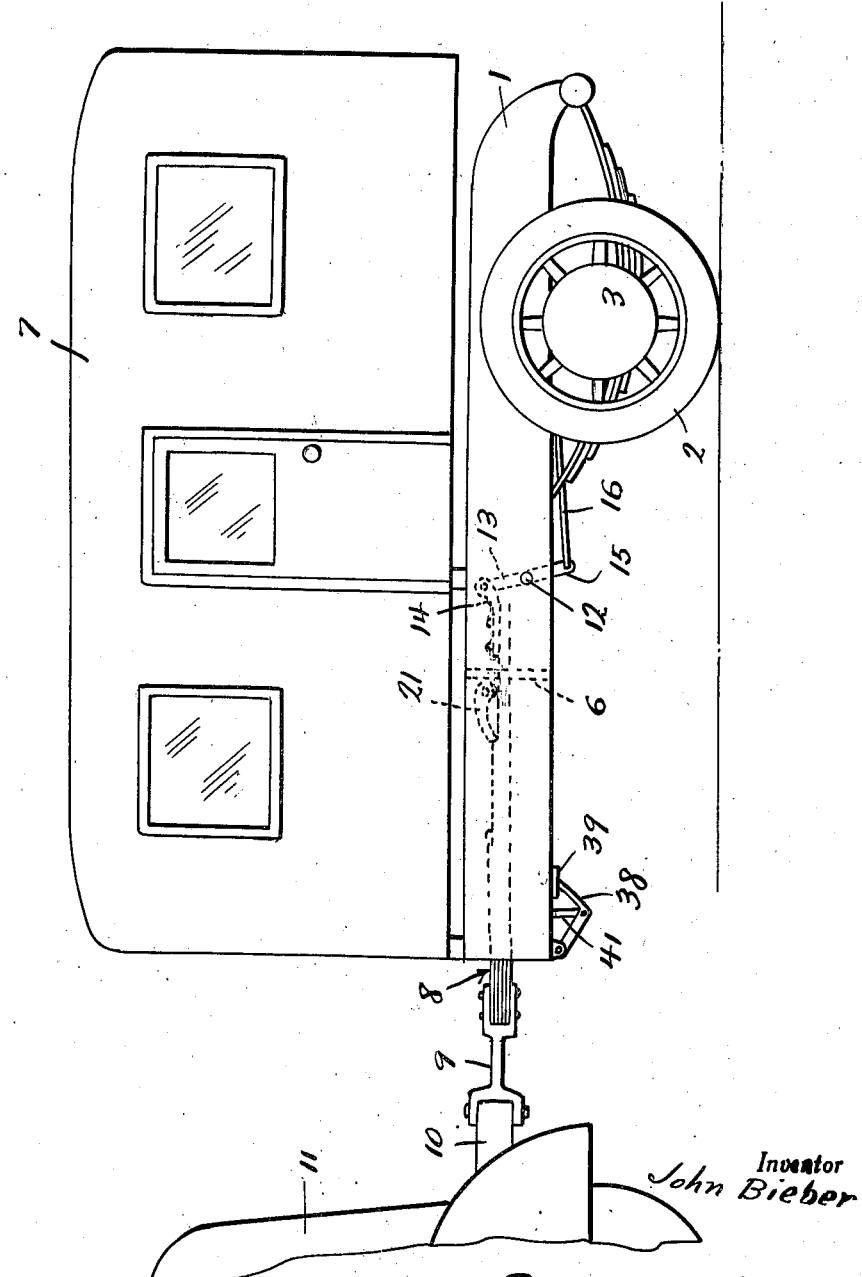

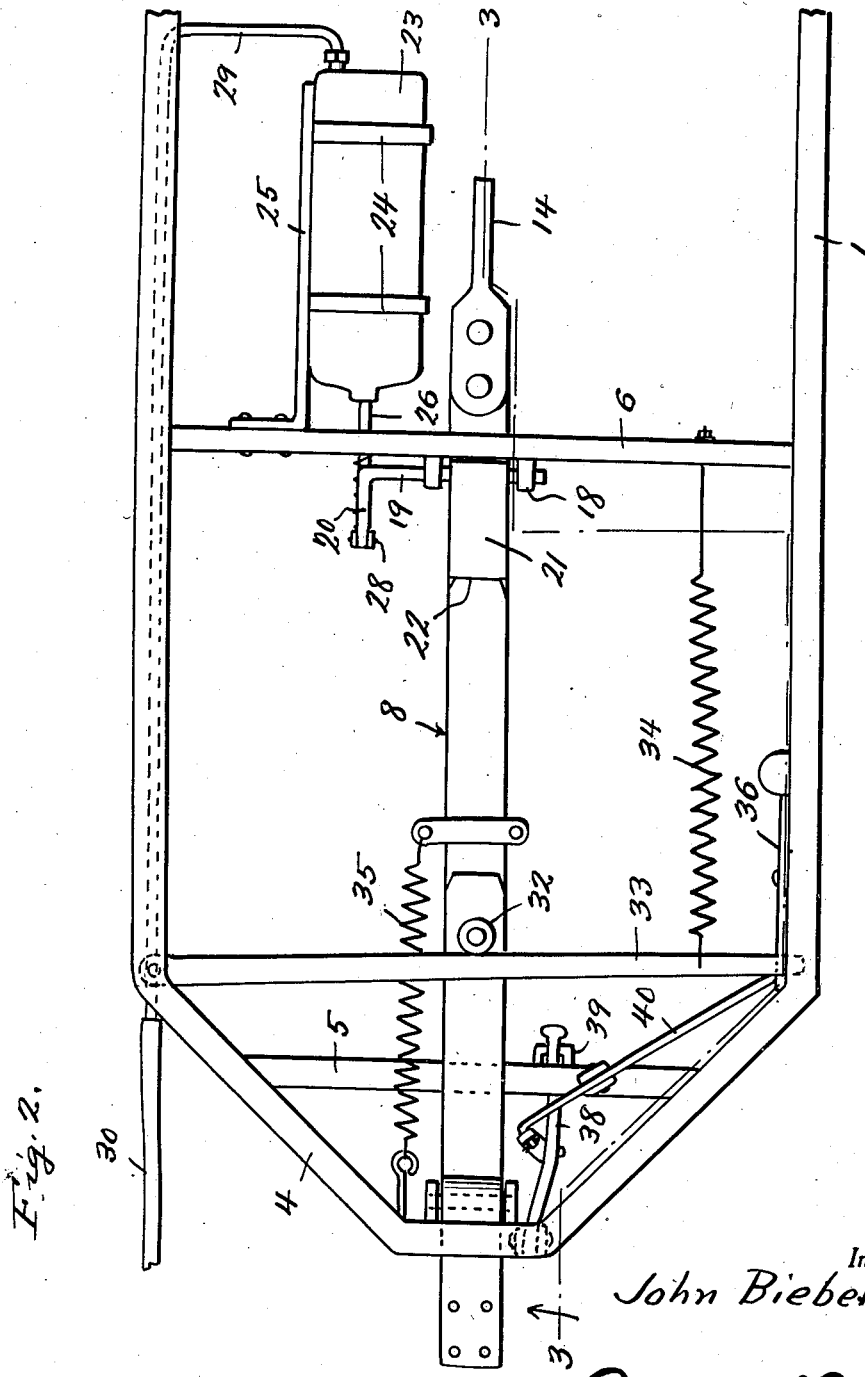

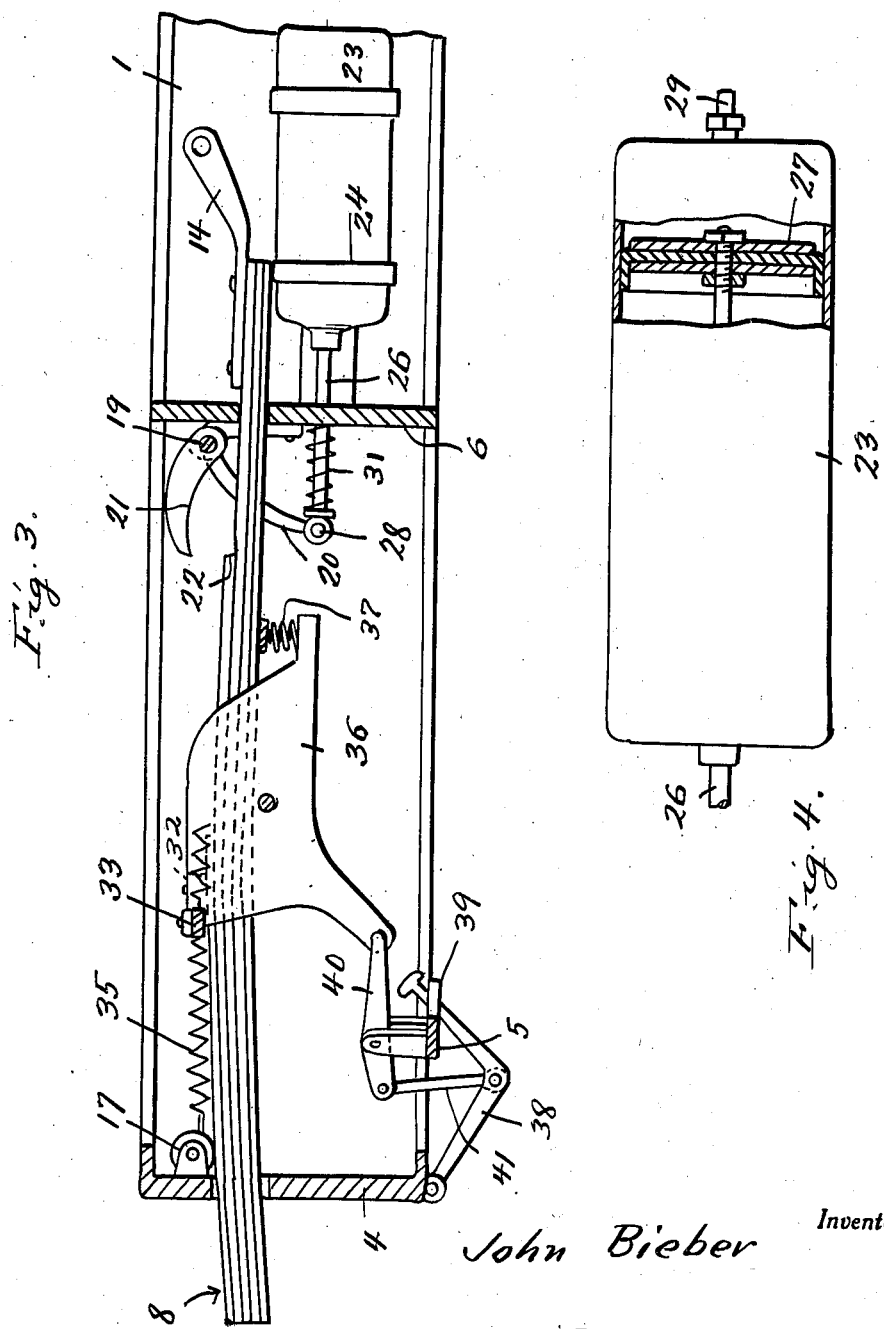

2,209,489

UNITED STATES PATENT OFFICE 2,209,489

TRAILER BRAKE

John Bieber, Redelm, S. Dak., assignor of forty-eight per cent to Harry C. Silverman, Dupree, S. Dak.

Application December 29, 1938, Serial No. 248,312

4 Claims. (Cl. 188—112)

This invention pertains to trailer brakes of a type generally similar to that constituting the subject matter of my U. S. Patent No. 2,093,185, issued Sept. 14, 1937, upon which the present apparatus constitutes an improvement.

The primary object of the present invention is to provide, in a manner as hereinafter set forth, a trailer brake mechanism of the character described, comprising novel means controlled from the driver's seat of the towing vehicle for rendering the brake applying mechanism inoperative when desired, as when backing.

Another important object of the invention is to provide an automatic trailer brake mechanism of the character described comprising a resilient drawbar of a novel construction for supporting the front end of a two wheeled trailer and for connecting said trailer to a towing vehicle.

Other objects of the invention are to provide a trailer brake mechanism of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a trailer provided with an automatic brake mechanism constructed in accordance with this invention.

Figure 2 is a top plan view of the invention.

Figure 3 is a view in vertical longitudinal section, taken substantially on the line 3—3 of Fig. 2.

Figure 4 is an elevational view of the vacuum cylinder and the piston, said piston and a portion of the cylinder being shown in section.

Referring to the drawings in detail, it will be observed that the reference numeral 1 designates a frame which is mounted on a pair of supporting wheels 2, said wheels being equipped with the usual brakes 3. The frame 1 terminates in a substantially V-shaped forward end portion 4. The frame 1 further includes cross members 5 and 6, as shown to advantage in Fig. 2 of the drawing. The reference numeral 7 designates a body which is mounted on the frame 1.

Extending slidably through openings which are provided therefor in the cross member 6 and in the forward end of the frame 1 is a resilient drawbar which is designated generally by the reference numeral 8. The drawbar 8, it will be observed, is in the form of a leaf spring. The forward end of the drawbar 8 is adapted to be connected by suitable means, as at 9, to the rear bumper 10, for example, of a towing vehicle 11. Journalled in the frame 1 at an intermediate point is a transverse shaft 12 having fixed thereon an arm 13 to which the rear end of the drawbar 8 is connected, as at 14. Also fixed on the rockable shaft 12 are arms 15 which are operatively connected to the trailer brakes 3 by rods 16. Journalled in the front end portion 4 of the frame 1 is a roller 17 which rests and travels on the drawbar 8 for supporting said front end of the frame thereon in a manner to reduce friction.

Journalled in suitable bearings 18 which are provided therefor on the cross member 6 of the frame 1 is a transverse shaft 19 having an arm 20 on one end. Fixed on the shaft 19 between the bearings 18 for swinging movement in a vertical plane is a dog 21. The rear end of one of the leaves comprising the drawbar 8 constitutes a shoulder or abutment 22 with which the dog 21 is engageable for positively preventing rearward sliding movement of said drawbar 8 in the frame 1.

The reference numeral 23 designates a vacuum cylinder which is secured, as at 24, on a bracket 25 which is mounted on the cross member 6. Extending slidably into the cylinder 23 through the forward end thereof is a rod 26 having thereon a piston 27 which is slidable in the cylinder 23. The forward end of the piston rod 26 is pivotally connected to the free end of the arm 20, as at 28. Connected to the rear end portion of the cylinder 23 is a conduit 29. A flexible conduit 30 connects the conduit 29 to any suitable vacuum or suction means on the towing vehicle 11. This suction through the cylinder 23 is to be controlled through the medium of a suitable valve (not shown) conveniently located in the towing vehicle 11, preferably on the instrument board thereof. A coil spring 31 (see Fig. 3) on the piston rod 26 actuates the shaft 19 in a manner to lift the dog 21 to inoperative position.

Journalled on the drawbar 8 at an intermediate point is a vertical roller 32. The reference numeral 33 designates a transverse lever having one end pivotally connected to one side of the frame 1 adjacent the front thereof, said lever extending across the drawbar 8 for engagement with the roller 32. A spring 34 is connected to the free end portion of the lever 33 for moving the drawbar 8 rearwardly in the frame 1 in a manner to apply the trailer brakes. A comparatively light or weak spring 35 is connected to the drawbar 8 for moving same forwardly in the frame 1.

Pivotally mounted on one side portion of the frame 1 is a latch 36 which is engageable with the free end portion of the lever 33 for releasably securing said lever against movement under the influence of the spring 34. A spring 37 engages the latch 36 with the lever 33. Pivotally mounted beneath the forward end portion of the frame 1 is an angular ground operated trip lever 38 the free end portion of which is operable in a guide 39 which is provided therefor on the cross member 5. Pivotally mounted, at an intermediate point, on the cross member 5 is a lever 40. One end of the lever 40 is operatively connected to the latch 36. The other end of the lever 40 is connected to the trip lever 38 for actuation thereby through the medium of a link 41.

It is thought that the operation of the mechanism will be readily apparent from a consideration of the foregoing. The dog 21 is normally in raised position out of engagement with the drawbar 8 where it is maintained by the coil spring 31. Of course, the towing vehicle 11 pulls the trailer through the medium of the drawbar 8. The forward end of the member 14 on the rear end portion of the drawbar 8 engages the cross member 6 for permitting said drawbar to pull the trailer. Should the trailer push forwardly on the towing vehicle, as when slowing down, stopping or going down grade, said trailer moves forwardly relative to the drawbar 8 thus rocking the shaft 12 in a manner to apply the trailer brakes. Should the operator of the towing vehicle wish to render the trailer brake mechanism inoperative, as when it is desired to back, the hereinbefore mentioned control valve on the instrument panel of said towing vehicle is opened to connect the cylinder 23 with a vacuum or suction means on said towing vehicle. Thus, the piston 27 is drawn rearwardly in the cylinder 23 and the dog 21 is swung downwardly on the drawbar 8 in the path of the shoulder or abutment 22 on said drawbar. It will thus be seen that rearward movement of the drawbar 8 in the frame 1 will be positively prevented and the trailer may be backed without operating the brake applying mechanism thereof. Should the trailer become disconnected from the towing vehicle and the front end thereof drop to the ground, the trip lever 38 engages the ground and is swung upwardly thereby. Through the medium of the link 41 and the lever 40, the latch 36 is disengaged from the lever 33 against the tension of the coil spring 37 thereby permitting the comparatively strong spring 34 to swing said lever 33 rearwardly. The lever 33 is engaged with the roller 32 on the drawbar 8 and thus said drawbar is moved rearwardly in the frame 1 for applying the brakes of the trailer. The spring 35 assists in releasing the trailer brakes by yieldingly urging the drawbar 8 forwardly. Of course, when the vacuum to the cylinder 33 is broken the piston 27 is moved forwardly again by the coil spring 31 and the dog 21 is raised to inoperative position.

It is believed that the many advantages of a trailer brake mechanism constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. In a trailer including supporting wheels having brakes, a resilient drawbar slidably mounted on the trailer and adapted for connection with a towing vehicle, said drawbar including a plurality of spring leaves, a shaft journalled on the trailer, a dog fixed on said shaft and engageable with one end of one of the spring leaves for releasably locking the drawbar against movement in a direction to apply the brakes, and means for actuating the shaft.

2. In a trailer including supporting wheels having brakes, a resilient drawbar slidably mounted on the trailer and adapted for connection with a towing vehicle, said drawbar including a plurality of spring leaves, a shaft journalled on the trailer, a dog fixed on said shaft and engageable with one end of one of the spring leaves for releasably locking the drawbar against movement in a direction to apply the brakes, and means for actuating the shaft, said means including a vacuum cylinder mounted on the trailer, a rod extending slidably into said cylinder, a piston on the rod operable in the cylinder, and an arm on the shaft pivotally connected to said rod.

3. In a trailer including a frame, supporting wheels for said frame, said supporting wheels having brakes, a drawbar slidably mounted on the frame and adapted for connection with a towing vehicle, means operatively connecting said drawbar to the brakes, a lever pivotally mounted on the frame and operatively connected with the drawbar, a spring connected to the lever for actuating same for moving the drawbar in a direction to apply the brakes, a spring pressed latch engaged with the lever for releasably securing said lever against movement under the influence of the spring, a cross member on the frame, a guide on said cross member, a lever pivotally mounted, at an intermediate point, on the cross member and having one end operatively connected to the latch for disengaging said latch from the first named lever, an angular lever having one end pivotally connected to the frame and its free end portion operable in the guide, and a link operatively connecting the second named lever to the third named lever for actuation thereby, said third named lever being engageable with the ground for releasing the first named lever.

4. In a trailer including a frame, supporting wheels for the frame having brakes, said frame including cross members having longitudinally aligned openings therein, a resilient drawbar slidable longitudinally in the openings and adapted for connection with a towing vehicle, a lever operatively connected with the brakes, means for connecting the rear end of the drawbar to the lever, said drawbar having a part engaging a cross member for communicating the pull on the drawbar by the towing vehicle to the trailer.

JOHN BIEBER.